United States Patent [19]

Michaud

[11] 4,269,393
[45] May 26, 1981

[54] TREE-FELLING LEVER

[76] Inventor: Honoré Michaud, Lamy, Co. Rivieré-du-Loup, Prov. of Quebec, Canada, G0L 1R0

[21] Appl. No.: 97,840

[22] Filed: Nov. 27, 1979

[51] Int. Cl.³ .............................................. B66F 3/00
[52] U.S. Cl. ................................ 254/104; 144/34 A; 254/131
[58] Field of Search ................ 254/17, 21, 25, 35–38, 254/44, 77, 104, 120, 131, 131.5, 132; 145/1 R, 1 A; 30/169, 171, 172

[56] References Cited

U.S. PATENT DOCUMENTS

| | | | |
|---|---|---|---|
| 326,621 | 9/1885 | Brackett et al. | 145/1 R |
| 498,677 | 5/1893 | McDonald | 254/36 |
| 2,843,932 | 7/1958 | Ferguson | 30/171 |
| 3,257,018 | 6/1966 | Miles | 254/131 |
| 3,953,048 | 4/1976 | Vincent et al. | 254/131 |
| 4,030,700 | 6/1977 | Dushku | 254/131 |
| 4,130,270 | 12/1978 | Andersson | 254/104 |

*Primary Examiner*—Robert C. Watson

[57] ABSTRACT

A tree-felling implement is disclosed, which is particularly effective for felling frozen trees. The implement is of the type comprising flat plate with a front transverse straight edge, a lever arm being rigidly secured to the top face of the flat plate and extending upwardly at an acute angle rearwardly from the flat plate. This implement is characterized by the provision of a bite member which downwardly projects from the bottom surface of the plate along the front transverse edge. Said bite member has a generally rectangular cross-section providing parallel front and rear flat side faces substantially perpendicular to the bottom surface of the plate and a flat edge surface substantially parallel to the bottom surface of the plate. The plate and the bite member are thin enough to be inserted into a saw kerf made in the trunk of a frozen tree. Upon pivoting of the plate within the kerf by means of the lever arm, the bite member enters into the lower frozen kerf surface without cracking the ice, and the uncracked ice provides an effective abutment to prevent the flat plate from slipping out of the kerf.

3 Claims, 8 Drawing Figures

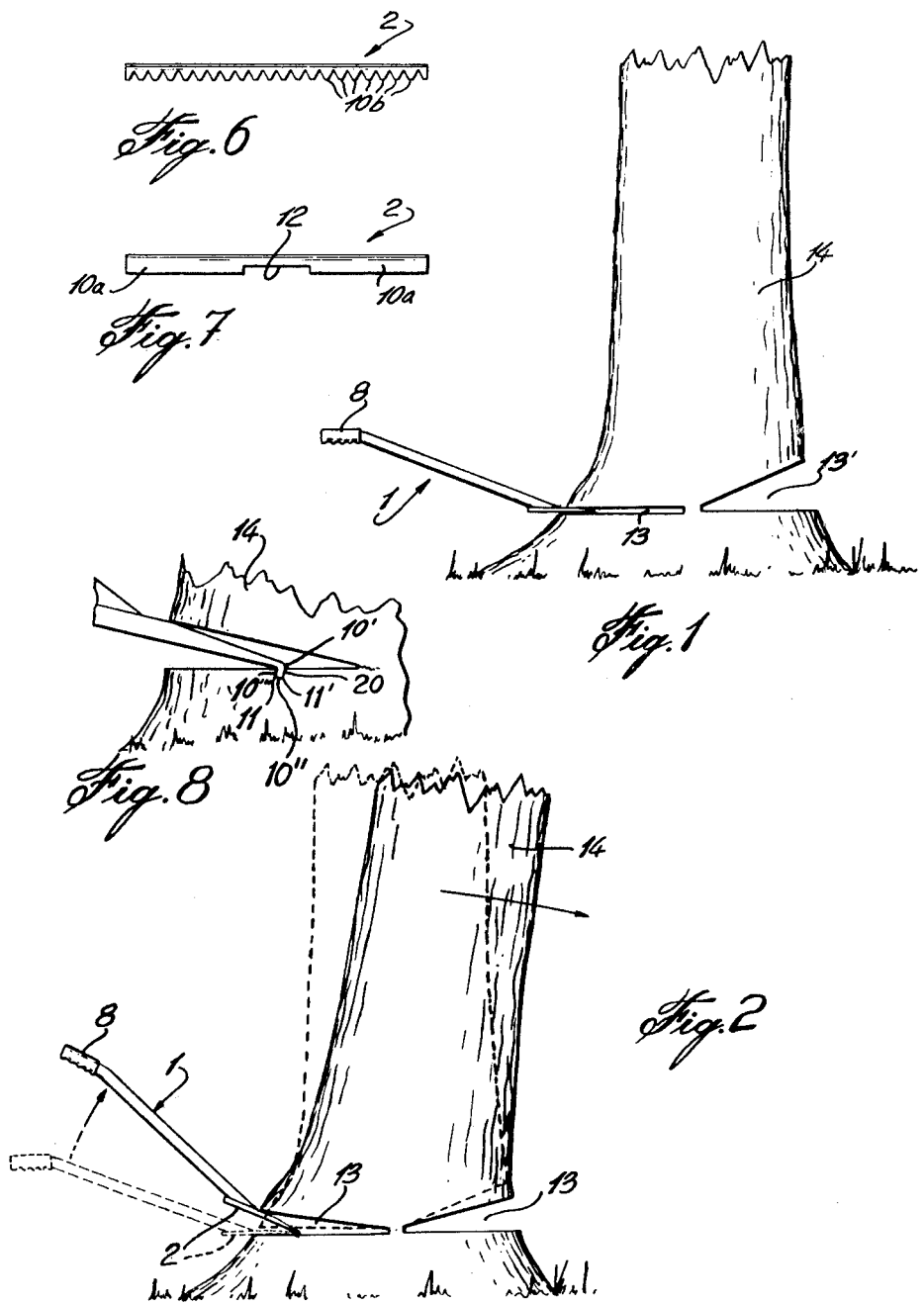

TREE-FELLING LEVER

FIELD OF THE INVENTION

The present invention relates to a lever type tool for felling trees.

BACKGROUND OF THE INVENTION

Many tools for felling partly sawn trees have been proposed: for example Canadian Pat. No. 173,775 teaches the use of a plurality of wedges inserted in a horizontal saw-cut to make the tree fall in a direction away from the wedges. This invention has the disadvantage of being difficult to carry in the forest by a woodsman and is also undesirable because an additional tool such as an axe is required to hammer the wedges into place. Canadian Pat. No. 156,949 shows the use of crossed arms secured to a threaded shaft which may be turned to force the ends of the arms vertically apart. This device is obviously subject to breakage, is also difficult to carry, and requires a very wide cut for its insertion and efficient operation. Canadian Pat. No. 150,018 makes use of a wedge which is screwed into place by an attached vise handle. This patent has the above mentioned disadvantages. Other types of wedges have variously been proposed in Canadian Pat. Nos. 1,000264; 769,931; and 550,170. It is also known to provide a flat plate having a straight transverse front edge and a level arm secured to the top face of said plate and extending upwardly at an acute angle and rearwardly from said top plate. The plate is inserted into the saw kerf and the level arm forced upwardly to pivot the plate about its front edge which digs into the kerf lower surface. It has been found, however, that, when felling a frozen tree, the front edge of the plate often slips along the kerf lower surface, and this often causes accidents.

OBJECTS OF THE INVENTION

It is the first object of the present invention to provide a very simple yet effective tree-felling lever device which is especially effective for felling frozen trees.

It is another object of the present invention to provide a tree-felling level which is used in combination with only one other tool, a saw, normally a powered chain saw.

It is yet another object of the present invention to provide a tree-felling lever which is lightweight, durable and easily carried by the woodsman.

SUMMARY OF THE INVENTION

The above and other objects of the invention are realized in accordance with a preferred embodiment, by providing a lever device having a flat plate an operational front transverse straight edge, a rigid lever arm angularly secured to the top surface of the flat plate and extending rearwardly from the same, and a handle or grip provided at the upper end of the lever arm. The front transverse edge is characteristically provided with a bite member protruding from the underface of said plate along said front transverse edge and generally of rectangular cross-section providing front and back parallel side faces perpendicular to the underface of the plate, and a flat edge face substantially parallel to the underface of the plate. The plate and its bite member are thin enough to be inserted into a saw kerf made in the trunk of a tree. The bite member prevents the flat plate from slipping or sliding when it is positioned in a saw kerf. The tree is felled simply by exerting upward force at the grip end of the shaft.

The above will be clearly understood by referring to the preferred embodiment, illustrated by way of the accompanying drawings, in which:

BRIEF DESCRIPTION OF THE DRAWINGS

FIG. 1 is a side view of the lower portion of a tree trunk also showing the implement of the present invention inserted into a saw kerf;

FIG. 2 is the same view of FIG. 1 shown in dashed outline and showing in black line the tilted tree trunk and the upwardly positioned implement of the invention;

FIG. 6 is a front elevation of the gripping means of the transverse edge according to a second embodiment;

FIG. 7 is a front elevation of the gripping means of the transverse edge according to a third embodiment; and FIG. 8 is a cross-sectional side elevation of the front portion of the flat plate in leverage position in a saw kerf.

Like numerals refer to like elements throughout the figures.

DETAILED DESCRIPTION OF THE INVENTION

Figure 3:
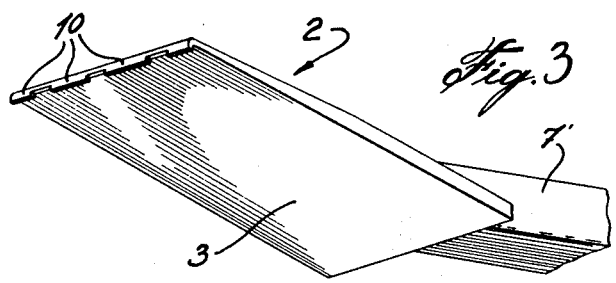
FIG. 3 is a perspective view of the bottom surface of the flat plate showing the gripping means of the transverse edge.

Lever 1 includes a flat rigid plate 2 generally rectangular in shape and preferably made of steel. As shown in FIG. 3, the bottom surface 3 of flat plate 2 is completely flat and straight. The top surface of flat plate 2 includes a rear portion 4 which is flat and parallel to bottom surface 3. Slightly forward of half the length of flat plate 2, the front portion 4' of the top surface of flat plate 2 tapers downwardly at a very acute angle such that flat plate 2 is relatively thin at its front transverse edge 5.

Figure 4:
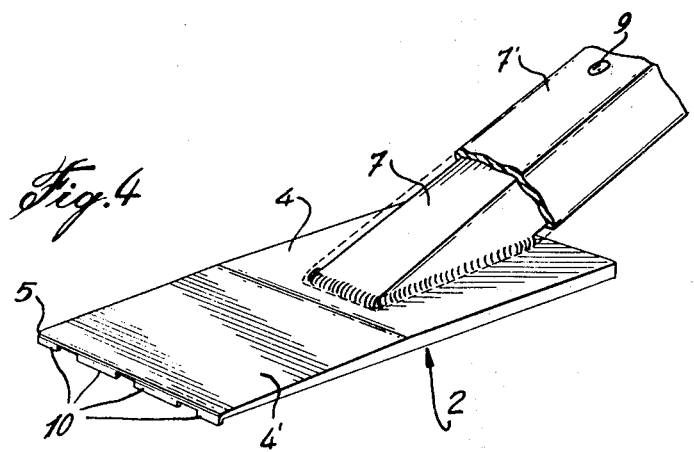
FIG. 4 is a perspective view of the top surface of the flat plate showing the outer lever arm section broken away to reveal the inner lever arm section.

This front transverse edge 5 is straight and is provided with a downwardly projecting gripping means of which three preferred embodiments are shown, the first in FIGS. 3 and 4, the second in FIG. 6 and the third in FIG. 7. The gripping means is essential to the invention as described and explained below.

The leverage portion of the implement comprises a lever arm preferably made of inner and outer lever arm sections 7 and 7', one telescoped within the other. The inner lever arm section 7 is preferably made of steel, square or rectangular in cross-section and preferably hollow for maximum lightness. Lever arm section is rigidly secured at its lower end to the rear portion 4 of the top surface of flat plate 2 at an acute angle to the latter, as clearly shown in FIG. 4, the angle being approximately 30 degrees.

Figure 5:
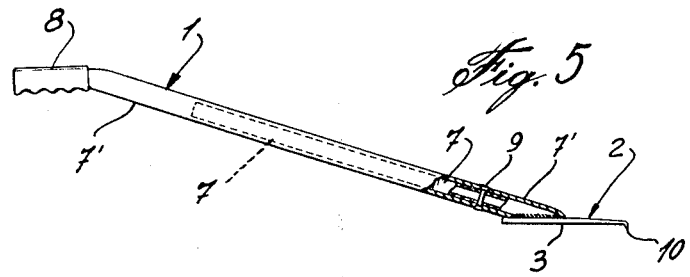
FIG. 5 is a side elevation of the implement, partially broken away to show the inner lever arm section which is in turn partially broken away.

As clearly shown in FIG. 5, lever arm section 7 extends inside outer lever arm section 7' a substantial portion of the length of the latter terminating short of a handle or grip 8 located at the outer upper end of outer lever arm section 7' and which extends outwardly in a plane generally parallel to the plane of flat plate 2.

The outer tubular lever arm section 7' is preferably made of aluminum for lightness and is rigidly attached to inner lever arm section 7 by means of a transverse rivet 9. As shown by the dashed lines in FIG. 4, outer lever arm section 7' extends around inner lever arm section down to the top surface of flat plate 2. Outer lever arm section 7 is preferably two or three feet in length. It will be noted that the two telescoped lever arm sections 7 and 7' result in a very rigid, strong and lightweight shank and that inner lever arm section 7 need not extend to handle 8 to assure such rigidity since the region of greatest stress on lever 1 will occur in the vicinity of flat plate 2 when lever 1 is forced upwardly.

The gripping means consists of a bite member 10 projecting downwardly from bottom surface 3 for a short distance at a right angle to the latter and located at the front transverse edge 5. Bit member 10, when seen in cross-section has a preferably curved top front corner portion 10', a flat edge bottom face 10" substantially parallel to bottom surface 3, a rear step flat face 10''' at a right angle to bottom surface 3 of flat plate 2 and a front flat face 20 parallel to step face 10'''. Step face 10''' and bottom face 10" define a sharp rear edge indicated at 11 and similarly front face 20 and bottom edge face 10" define a sharp front edge 11'.

Bite member 10 may be of different configurations when seen from the front or back: FIGS. 3 and 4 depict four spaced-apart elongated bite member sections 10, FIG. 7 shows two bite member sections 10a separated by a middle space 12 and FIG. 6 shows a plurality of bite member sections 10b defining a saw-tooth configuration. It will be understood, however, that bite members 10 are not limited to these configurations but always have the above-defined cross-sectional shape.

The operative technique for lever 1 is very simple: first a kerf 13 is made in a tree trunk 14 diametrically opposite the direction in which it is desired that the tree should fall. A second wedge-shaped kerf 13' is made on the other side of tree 14 in the usual manner. Flat plate 2 is then inserted in kerf 13. It will be noted that flat plate 2, including bite member 10, is then enough to be inserted in a kerf made by a power chain saw which is the prevalent saw used in modern forestry. To topple the tree 14, an upward force is exerted at handle 8. As this upward force is applied, front transverse edge 5 will be biased downwardly and so cause bite member 10 to dig into the lower face of kerf 13 as shown in FIG. 8. Since the leverage action of lever 1 is directed toward the tree as well as upwardly, an opposed force, directed toward the left in FIG. 2, will tend to push front transverse edge 5 out of kerf 13. When the tree is frozen and ice is present at the lower surface of the kerf, it has been found that the particular shape of bite member 10, effectively counteracts this force its by insertion into the frozen wood in the lower face of kerf 13 without cracking the ice at the bite member. Therefore, uncracked ice forms an effective abutment for the bite member. The ice is not cracked because faces 20, 10''', and 10" of bite member 10, when entering into the kerf lower surface, do not exert any substantially horizontal component force along said kerf lower surface. Edge face 10" only exerts a vertical downward pressure while side faces 20 and 10''' cleanly enter the ice surface.

Obviously, lever arm sections 7 and 7' can be replaced by a one-piece lever arm directly secured to flat plate 2 and made, for instance, of square or rectangular steel tubing.

What I claim is:

1. A tree-felling lever, especially for frozen trees, comprising a flat plate having top and bottom surfaces and a front transverse straight edge, a lever arm rigidly secured to the top face of said flat plate and extending upwardly at an acute angle and rearwardly from said flat plate, and a bite member downwardly projecting from said bottom surface along said front transverse edge and having parallel front and rear flat faces substantially perpendicular to said bottom surface, and a free edge flat face substantially parallel to said bottom surface, said plate and bite member being thin enough to be inserted into a saw kerf made in the trunk of a frozen tree, whereby said tree may be felled by exerting upward force on the outer end of said lever arm, thus causing pivoting of said plate in said kerf about said bite member and insertion of said bite member into the lower kerf surface practically without cracking the ice in said lower kerf surface, the uncracked ice at the back of the inserted bite member providing an effective abutment means for said bite member, in order for the latter to prevent the flat plate from slipping out of the kerf.

2. A tree-felling lever as defined in claim 1, wherein said lever arm consists of two sections: an inner section and an outer tubular section, said inner section being telescoped within said outer section along a substantial portion of the length of said outer section; said inner section being rigidly secured to said flat plate and also rigidly secured to said outer section, said outer section being made of a lighter and weaker material than that of said inner section.

3. A tree-felling lever as defined in claim 2, wherein the upper end of said outer section is provided with a handle extending away from said upper end and lying in a plane generally parallel to the plane of said flat plate.

* * * * *